(12) United States Patent
Sorkin et al.

(10) Patent No.: US 11,394,286 B2
(45) Date of Patent: Jul. 19, 2022

(54) PROCESS CONTROL USING AMPLITUDE CONTROL LOOP

(71) Applicant: Safran Power USA, LLC, Twinsburg, OH (US)

(72) Inventors: Lev Sorkin, Cranford, NJ (US); Russel Ibrahim, Howell, NJ (US)

(73) Assignee: Safran Power USA, LLC, Twinsburg, OH (US)

( * ) Notice: Subject to any disclaimer, the term of this patent is extended or adjusted under 35 U.S.C. 154(b) by 0 days.

(21) Appl. No.: 17/276,150

(22) PCT Filed: Sep. 28, 2018

(86) PCT No.: PCT/US2018/053265
§ 371 (c)(1),
(2) Date: Mar. 14, 2021

(87) PCT Pub. No.: WO2020/068090
PCT Pub. Date: Apr. 2, 2020

(65) Prior Publication Data
US 2022/0037981 A1    Feb. 3, 2022

(51) Int. Cl.
*H02M 3/157*    (2006.01)
*H02M 1/00*    (2006.01)

(52) U.S. Cl.
CPC ....... *H02M 1/0025* (2021.05); *H02M 1/0012* (2021.05); *H02M 3/157* (2013.01)

(58) Field of Classification Search
CPC .. H02M 1/0025; H02M 1/0012; H02M 3/157; H02M 1/003
See application file for complete search history.

(56) References Cited

U.S. PATENT DOCUMENTS

| | | | | |
|---|---|---|---|---|
| 5,206,575 | A * | 4/1993 | Nakamura | H02P 23/26 318/807 |
| 9,698,665 | B2 * | 7/2017 | Khajehoddin | H02M 1/00 |
| 2008/0288201 | A1 | 11/2008 | Oettinger et al. | |

FOREIGN PATENT DOCUMENTS

| | | |
|---|---|---|
| EP | 1708351 A2 | 10/2006 |
| TG | 2010/036974 A2 | 4/2010 |

OTHER PUBLICATIONS

International Patent Application No. PCT/US2018/053265, International Search Report and Written Opinion, dated May 22, 2019.

* cited by examiner

*Primary Examiner* — Adolf D Berhane
(74) *Attorney, Agent, or Firm* — Kilpatrick Townsend & Stockton LLP

(57) ABSTRACT

Described is a method that includes receiving a reference signal including an adjustable-amplitude sine wave. The method also includes receiving a voltage feedback signal from a voltage control loop. The voltage feedback signal is a point-of-regulation sine wave, and the voltage control loop includes a first response time. The method also includes comparing the reference signal to the voltage feedback signal to generate an error value. Further, the point-of-regulation sine wave is controlled in the method based on a proportional-integral-derivative input and a current feedback signal. The proportional-integral-derivative input is based on the error value. Additionally, the method includes adjusting the reference signal based on an output of an amplitude control loop. The amplitude control loop includes a second response time that is at least one order of magnitude slower than the first response time of the voltage control loop.

20 Claims, 2 Drawing Sheets

PROCESS CONTROL USING AMPLITUDE CONTROL LOOP

TECHNICAL FIELD

The field of the present disclosure relates to control of a process to regulate output voltages of the process. More specifically, the present disclosure relates to proportional-integral-derivative (PID) controllers used to regulate output voltages of converters or inverters using amplitude loop control in conjunction with voltage loop control and current loop control.

BACKGROUND

Proportional-integral-derivative (PID) controllers are used to control output voltages of high-power converters and inverters. To improve control loop stability of the PID controller on the high-power converter or inverter, the high-power converter or inverter is also controlled based on a current feedback signal from a current control loop. For example, the current feedback signal is used by a controller to increase or decrease a current output to a load of the high-power converter or inverter. While the current feedback signal provides stability to the output of the high-power converter or inverter, changes to a load coupled to the high-power converter or inverter affects the output voltage due to changes in output current resulting from current compensation initiated by the current feedback signal. This distortion of the output voltage may result in inaccurate control of the high-power converter or inverter. Further, compensating for the distortion of the output voltage with a voltage control loop operating at similar response times may result in instability of the output of the high-power converter or inverter due to competition between feedback signals.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a method may include receiving a reference signal including an adjustable-amplitude sine wave. The method may also include receiving a voltage feedback signal from a voltage control loop including a point-of-regulation sine wave. The voltage control loop may include a first response time. Further, the method may include comparing the reference signal to the voltage feedback signal to generate an error value. Furthermore, the method may include controlling the point-of-regulation sine wave based on a proportional-integral-derivative input and a current feedback signal. The proportional-integral-derivative input may be based on the error value. Furthermore, the method may include adjusting the reference signal based on an output of an amplitude control loop. The amplitude control loop may include a second response time that is at least one order of magnitude slower than the first response time of the voltage control loop.

According to certain embodiments of the present disclosure, a system may include a proportional-integral-derivative control block. The proportional-integral-derivative control block may include a first error amplifier that receives a reference signal and a voltage feedback signal and outputs a first error value. The proportional-integral-derivative control block may also include a process that controls a point-of-regulation sine wave based on a proportional-integral-derivative control function and a current feedback signal. The proportional-integral-derivative control function may be based on the first error value. Additionally, the proportional-integral-derivative control block may include a voltage control loop that provides the point-of-regulation sine wave to the first error amplifier from the process. The proportional-integral-derivative control block may include a first response time. The system may also include a reference signal control block. The reference signal control block may include a second error amplifier that receives an amplitude of the point-of-regulation sine wave and a direct current reference voltage and outputs a second error value. Further, the reference signal control block may include a proportional-integral control function generator that generates a proportional-integral control function based on the second error value. Furthermore, the reference signal control block may include a reference amplitude controller that controls the reference signal received at the first error amplifier based on the proportional-integral control function. Moreover, the reference signal control block may include an amplitude control loop that provides the proportional-integral control function to the reference amplitude controller, and the reference signal control block may include a second response time greater than the first response time.

According to certain embodiments of the present disclosure, a method may include receiving a reference signal including an adjustable-amplitude sine wave. The method may also include receiving a voltage feedback signal including an output voltage of a process and comparing the reference signal to the voltage feedback signal to generate a first error value. Further, the method may include controlling the output voltage of the process based on a first proportional control signal that is proportional to the first error value, a first integral control signal based on an integral of the first error value over time and including a first integral gain value, a derivative control signal based on a rate of change over time of the first error value, and a current feedback signal. Furthermore, the method may include comparing an amplitude of the output voltage of the process to a constant direct current reference voltage to generate a second error value. Additionally, the method may include controlling the adjustable-amplitude sine wave based on a second integral control signal based on the integral of the second error value over time. The second integral control signal may include a second integral gain value that is smaller than the first integral gain value.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to control of a process using a proportional-integral-derivative (PID) controller with an amplitude control loop. The process, which may include a polyphase convertor or inverter that generates a polyphase power output, may be used to control a power output to a load, such as an aircraft electrical system. Control of the process may be affected by a level of the load receiving the power output from the process. For example, as the size of the load increases, the power output of the process may stray from a desired power output. Implementing a current control loop for the process may improve system stability by maintaining the current at a desired level for the desired power output. However, current feedback of the current control loop affects accuracy of output voltage regulation of the process. For example, the output voltage of the processor may be reduced as the load increases due to the current drawn by the load and the current control loop.

To improve control of the power output of the process when a current control loop is implemented, the PID controller described below with respect to FIGS. 1 and 2 includes an amplitude control loop for control of the process. The amplitude control loop, which may include a reaction time at least an order of magnitude slower than other control loops associated with the process, controls a voltage output of a reference voltage used to generate a voltage error signal. This voltage error signal is used to control the voltage output of the process. Because the amplitude control loop includes a slow reaction time in comparison to the other control loops associated with the process, the amplitude control loop does not react quickly enough to compete with the other control loops. Because the amplitude control loop does not compete with the other control loops, the overall stability of the control system remains robust.

The described embodiments provide a control system that controls a power output of a process to a load. While the control system is discussed generally for use in an aircraft electronics system, it is by no means so limited. Rather, embodiments of the control system may be used in process control of any type or otherwise as desired.

Figure 1:
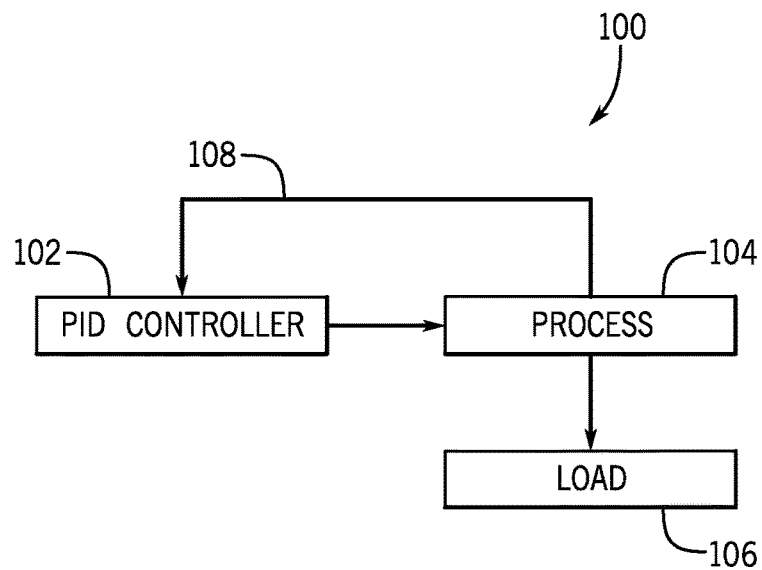
FIG. 1 is a block diagram of a control system including a proportional-integral-derivative (PID) controller used to control a process, according to certain embodiments of the present disclosure.

FIG. 1 is a block diagram of a control system 100 including a proportional-integral-derivative (PID) controller 102 used to control a process 104. The PID controller 102 is a control loop feedback mechanism used to provide continuous modulated control to the process 104. A modulated control signal generated by the PID controller 102 is based on an error value (i.e., a difference) between an output of the process 104 and a desired setpoint provided to the PID controller 102. The error value is fed to a proportional value block, an integral value block, and a derivative value block of the PID controller 102 to generate an overall control function. The overall control function is used to generate a pulse width modulation signal, which is then filtered to produce the power output of the process 104.

In an example, the process 104 is an inverter, a converter, an output filter, or any other power regulation mechanism. The process 104 may provide a power output to the load 106. The load 106 may be an electrical system of an aircraft, or any other electrical system or device that places a resistive load on the process 104.

In addition to providing the power output to the load 106, the process 104 provides a feedback signal to a feedback loop 108. In an example, the feedback signal may include an indication of a voltage of the power output, a current of the power output signal from the process 104. The feedback signal may be used by the PID controller 102 to generate the overall control function that regulates the process 104.

Figure 2:
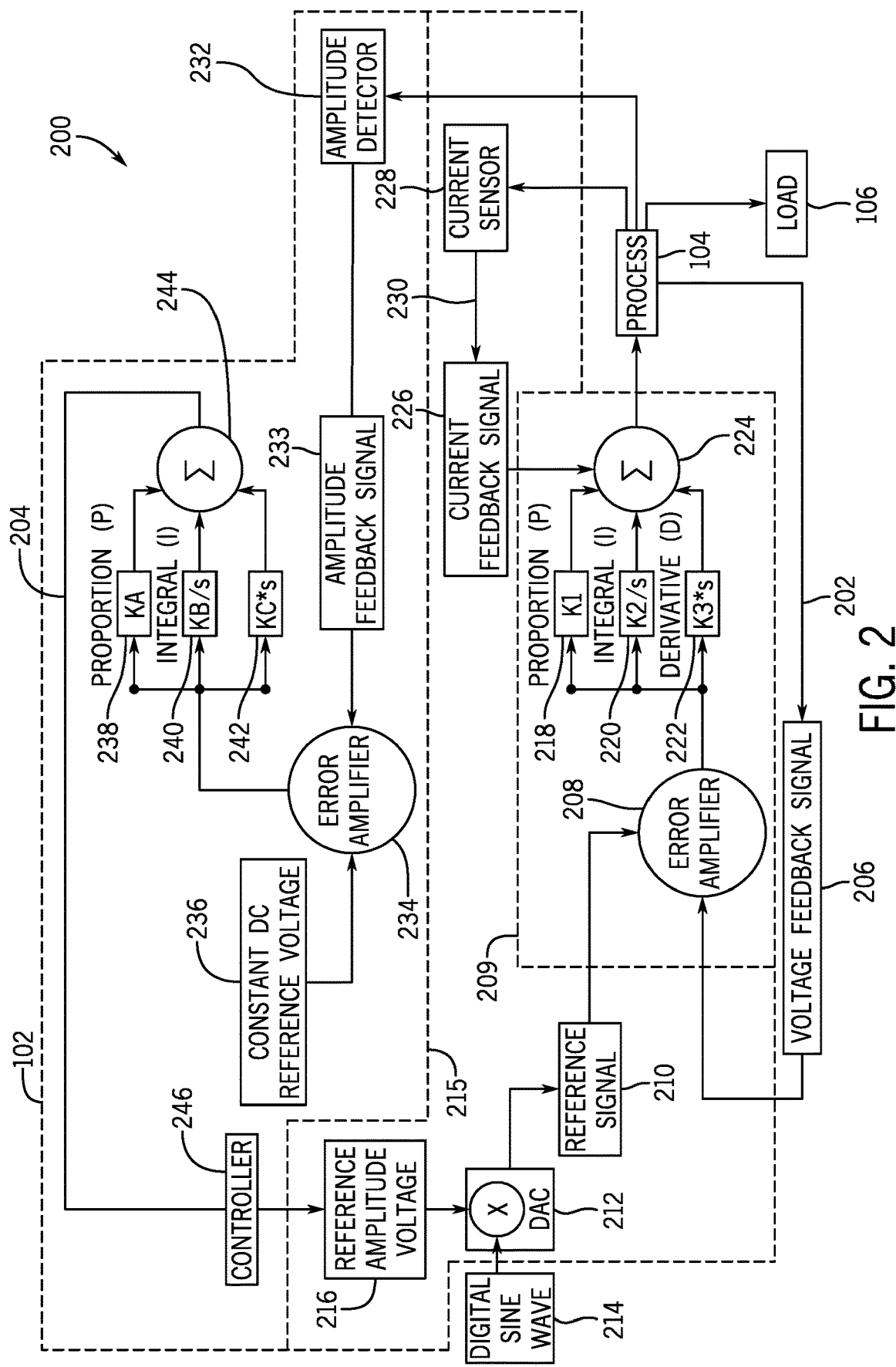
FIG. 2 is a block diagram of a control system including a PID controller used to control a process with a voltage control loop and an amplitude control loop, according to certain embodiments of the present disclosure.

FIG. 2 is a block diagram of a control system 200 including the PID controller 102 used to control the process 104 with a voltage control loop 202 and an amplitude control loop 204. The voltage control loop 202 may provide a voltage feedback signal 206 to a voltage error amplifier 208 of a PID control block 209 of the PID controller 102. In an example, the voltage feedback signal 206 represents a polyphase voltage output of the process 104. The voltage error amplifier 208 also receives a reference signal 210, which is generated by a digital-to-analog controller 212. The digital-to-analog controller 212 may generate the reference signal 210 based on a digital sine wave 214 received from a complex programmable logic device (CPLD)(not shown), a field-programmable gate array (FPGA)(not shown), or any other microcontroller and based on a reference amplitude voltage 216 received from the amplitude control loop 204 of a reference signal control block 215.

The voltage error amplifier 208 compares the reference signal 210 to the voltage feedback signal 206 and outputs a difference between the reference signal 210 and the voltage feedback signal 206. The difference output by the voltage error amplifier 208 is fed into a proportional value block 218, an integral value block 220, and a derivative value block 222 of the PID control block 209. A value output by the proportional value block 218 (i.e., a proportional control signal) is proportional to a present value of the output of the voltage error amplifier 208. In an example, the value of the proportional value block 218 includes a tuning constant 'K1' (e.g., a proportional gain value), which is tuned to help balance a control function output by the PID controller 102.

A value output by the integral value block 220 (i.e., an integral control signal) accounts for past values output by the voltage error amplifier 208, and the integral value block 220 integrates these values over time to generate the value output by the integral value block 220. The integral value block 220 is used to account for and remove residual error based on a historic cumulative value of the voltage error generated by the process 104. In an example, the value of the integral value block 220 includes a tuning constant 'K2' (e.g., an integral gain value), which is tuned to help balance the control function output by the PID controller 102. The tuning constant K2 is represented as a tuning constant divided by 's,' where 's' represents the Laplace variable. Accordingly, dividing K2 by 's' represents an integral value of the output of the voltage error amplifier 208 that is output from the integral value block 220.

A value output by the derivative value block 222 (i.e., a derivative control signal) accounts for an estimate of a future trend of the output of the voltage error amplifier 208. The derivative value block 222 is based on the current rate of change of the output of the voltage error amplifier 208, and the derivative value block 222 seeks to reduce the effect of the error of the process 104 by dampening effects of the rate of change of the output of the voltage error amplifier 208. In an example, the value output by the derivative value block 222 includes a tuning constant 'K3' (e.g., a derivative gain value), which is tuned to help balance the control function output by the PID controller 102. The tuning constant K3 is represented as a tuning constant multiplied by 's,' where 's' represents the Laplace variable. Accordingly, multiplying K3 by 's' represents a derivative value of the output of the voltage error amplifier 208 that is output from the derivative value block 222.

An overall control function of the PID blocks 218-222 of the PID controller 102 may be represented by the following equation:

$$Vout(t) = K1 * Verr(t) + K2 * \int_0^T Verr(t)dt + K3 * \frac{dVerr(t)}{dt} \quad \text{(Equation 1)}$$

where K1, K2, and K3 are all non-negative values, Vout(t) is a combined voltage input to a summer 224, and Verr(t) is the output of the voltage error amplifier 208. A proportional component, an integral component, and a derivative component of the control function Verr(t) are generated by feeding the values output by the proportional value block 218, the integral value block 220, and the derivative value block 222 into the summer 224. While each of the PID blocks 218-222 are described above for use in the control function Verr(t), one or more of the PID blocks 218-222 may be turned off by setting the turning constant K1, K2, or K3 to a value of zero. For example, the PID controller 102 may also operate as a PI controller, a PD controller, an ID controller, a P controller, an I controller, or a D controller based on which of the tuning constant values K1, K2, and K3 are set to zero. Further, a response time of the PID control block 209 may be controlled by adjusting the values of the tuning constants K1, K2, or K3. For example, increasing the value of a tuning constant K1, K2, or K3 may result in a faster response time, while decreasing the value of the tuning constant K1, K2, or K3 may result in a slower response time.

In an example, a current feedback signal 226 is also provided to the summer 224 such that voltage control from the control function Vout(t) generated by the PID blocks 218-222 and current control based on the current feedback signal 226 are both provided to control the voltage and the current outputs of the process 104. A current sensor 228 may be positioned to detect an output current from the process 104 and provide a current controlled voltage source as the current feedback signal 226 to the summer 224. The current feedback signal 226 may be detected by the current sensor 228 using an instantaneous current sensing technique. A current control loop 230, which may include feeding the current feedback signal 226 from the current sensor 228 to the summer 224, may improve overall system stability of the process 104. However, the current control loop 230 also affects accuracy of output voltage regulation provided by the control function Vout(t). For example, the voltage output of the process 104 may be reduced as the load 106 on the output of the process 104 increases when the process 104 is controlled with the current control loop 230. In the example, a change in a current caused by the load 106 results in the current feedback signal 226 changing an output voltage of the process 104 to achieve stability in both the current and the voltage output from the process 104. In an example, the consumption of current by the load 106 may result in a reduction of the amplitude output by the process 104.

To compensate for the reduction in output voltage based on implementation of the current control loop 230, the amplitude control loop 204 of the reference signal control block 215 is implemented. The reference signal control block 215 may be used to control an amplitude of the reference signal 210, which may be relied upon by the PID control block 209 when generating the control function Verr(t). An amplitude detector 232 of the reference signal control block 215 is positioned at a point-of-regulation of the process 104. An amplitude feedback signal 233 representative of an amplitude of the output voltage signal of the process 104 is provided from the amplitude detector 232 to an amplitude error amplifier 234. The amplitude error amplifier 234 also receives a constant direct current (DC) reference voltage signal 236. The amplitude error amplifier 234 compares the constant DC reference voltage signal 236 to the amplitude feedback signal 233 and outputs a difference between the constant DC reference voltage signal 236 and the amplitude feedback signal 233. The difference output by the amplitude error amplifier 234 is fed into a proportional value block 238, an integral value block 240, and a derivative value block 242 of the reference signal control block 215. The combination of the proportional value block 238, the integral value block 240, the derivative value block 242, and a summer 244 may collectively be referred to as a PID control function generator. Further, when the derivative value block 242 is unused, the proportional value block 238 and the integral value block 240, and the summer 244 may collectively be referred to as a proportional-integral (PI) control function generator. A value output by the proportional value block 238 (i.e., a proportional control signal) is proportional to a current value of the output of the amplitude error amplifier 234. In an example, the value output by the proportional value block 238 includes a tuning constant 'KA' (e.g., a proportional value gain), which is tuned to help balance an amplitude control function output on the amplitude control loop 204.

A value output by the integral value block 240 (i.e., an integral control signal) accounts for past values output by the amplitude error amplifier 234, and the integral value block 240 integrates these values over time to generate the value output by the integral value block 240. The integral value block 240 is used to account for and remove residual error based on a historic cumulative value of the amplitude error output by the process 104. In an example, the value output by the integral value block 240 includes a tuning constant 'KB' (e.g., an integral value gain), which is tuned to help balance the control function output on the amplitude control loop 204. The tuning constant KB is represented as a tuning constant divided by 's,' where 's' represents the Laplace variable. Accordingly, dividing KB by 's' represents an integral value of the output of the amplitude error amplifier 234 that is output from the integral value block 240.

A value output by the derivative value block 242 (i.e., a derivative control signal) accounts for an estimate of a future trend of the output of the amplitude error amplifier 234. The derivative value block 242 is based on the current rate of change of the output of the amplitude error amplifier 234, and the derivative value block 242 seeks to reduce the effect of the amplitude error of the process 104 by dampening effects of the rate of change of the output on the amplitude error amplifier 234. In an example, the value output by the derivative value block 242 includes a tuning constant 'KC' (e.g., a derivative value gain) which is tuned to help balance the control function output on the amplitude control loop 204. The tuning constant KC is represented as a tuning constant multiplied by 's,' where 's' represents the Laplace variable. Accordingly, multiplying KC by 's' represents the derivative value of the output of the amplitude error amplifier 234 that is output from the derivative value block 242.

An overall amplitude control function of the PID blocks 238-242 may be represented by the following equation:

$$Voutref(t) = KA*Vepk(t) + KB*\int_0^T Vepk(t)dt + KC*\frac{dVepk(t)}{dt} \quad \text{(Equation 2)}$$

where KA, KB, and KC are all non-negative values, Voutref (t) is a combined voltage that is output by a summer 244, and Vepk(t) is the output of the amplitude error amplifier 234. The control function Voutref(t) is generated by feeding the values output by the proportional value block 238, the integral value block 240, and the derivative value block 242 into the summer 244. While each of the PID blocks 238-242 are described above for use in the control function Voutref (t), one or more of the PID blocks 238-242 may be turned off by setting the turning constant KA, KB, or KC to a value of zero. For example, the PID components of the PID blocks 238-242 may also operate as a PI controller, a PD controller, an ID controller, a P controller, an I controller, or a D controller based on which of the tuning constant values KA, KB, and KC are set to zero. Further, a response time of the reference signal control block 215 may be controlled by adjusting the values of the tuning constants KA, KB, or KC. For example, increasing the value of a tuning constant KA, KB, or KC may result in a faster response time, while decreasing the value of the tuning constant KA, KB, or KC may result in a slower response time.

The resulting control function Voutref(t) is provided to a controller 246, which controls a value of the reference amplitude voltage 216. In turn, the reference amplitude voltage 216 is used to set the amplitude of the reference signal 210 provided to the voltage error amplifier 208. Thus, as the amplitude of the reference signal 210 increases or decreases based on changes to the reference amplitude voltage 216, the target of the voltage feedback signal 206 also increases or decreases. Due to changes in the error value output by the voltage error amplifier 208, the increases or decreases of the reference signal 210 result in increases or decreases to the voltage output by the process 104. The increases or decreases to the voltage output by the process 104 may compensate for any increases or decreases in the voltage output of the process 104 due to changes in the value of the load 106.

To prevent the reference signal control block 215 from competing with the PID control block 209, a response time of reference signal control block 215 may be at least an order of magnitude slower than a response time of the PID control block 209 and the current control loop 230. The response time may refer to an amount of time needed for the reference signal control block 215, the PID control block 209, and the current control loop 230 to implement changes to a control function. For example, the reference signal control block 215 may take hundreds of milliseconds to enact a change on the reference amplitude voltage 216 while the PID control block 209 may take tens of milliseconds or fewer to enact a change on the voltage output of the process 104. Further, the current control loop 230 may also take tens of milliseconds or fewer to enact a change on the current output of the process 104. Other response times are also contemplated where the amplitude control loop 204 has a response time that is an order of magnitude slower than the response times of the voltage control loop 202, the current control loop 230, or both. Because of the differences in response time, the derivative value block 242, which represents the rate of change of the amplitude error output by the amplitude error amplifier 234, may not be particularly relevant to control of the reference amplitude voltage 216. For example, the amplitude control loop 230, including the PID control blocks 238, 240, and 242, operates at a speed that is at least an order of magnitude slower than the PID control block 209. Thus, any rapid changes to the output voltage of the process 104 is compensated by the PID control loop 209. Accordingly, the value of the tuning constant KC may be set to zero to establish PI control by the controller 246 based on values output by the proportional value block 238 and the integral value block 240.

Further, to control a response time of the reference signal control block 215, a value of the tuning constants KA, KB, KC, or a combination thereof may be adjusted. For example, the value of the tuning constants KA, KB, or KC may be brought toward zero to slow down the response time of the reference signal control block 215. By setting the value of the tuning constants KA, KB, or KC to a value that controls the reference signal control block 215 to a relatively slow response time, the reference signal control block 215 will not have time to fully control the reference amplitude voltage 216 to compensate for a quick change in amplitude output by the process 104. For example, the reference signal control block 215 may only control the reference amplitude voltage 216 for amplitude changes of the process 104 that go beyond brief transient voltage spikes or drops. Accordingly, the reference signal control block 215 will avoid disrupting overall system stability because the reference signal control block 215 does not compete with the PID control block 209 or the current control loop 230.

Figure 3:
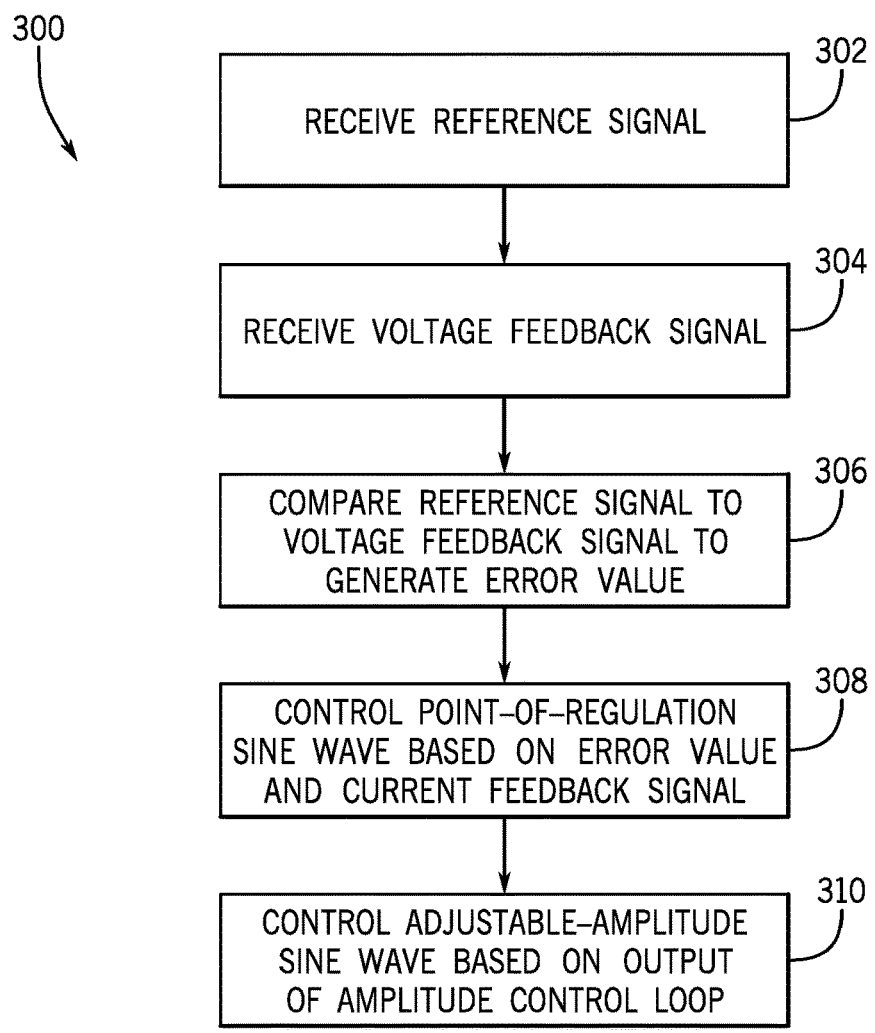
FIG. 3 is a flowchart of a method for controlling a process using the control system of FIG. 2, according to certain embodiments of the present disclosure.

FIG. 3 is a flowchart of a method 300 for controlling the process 104 using the control system 200. As discussed above, the output of the process 104 is controlled using the control function Vout(t). To maintain a stable regulated output signal of the process 104, the control function Vout(t) is generated by the PID controller 102 based on voltage feedback signals 206 and current feedback signals 226 provided on the control loops 202 and 230. Further, the voltage error value output by the voltage error amplifier 208, which ultimately determines the generated control function Vout(t), is based on the reference signal 210 the amplitude of which is controlled by the reference signal control block 215.

At block 302, the method 300 involves receiving the reference signal 210 at the voltage error amplifier 208. As discussed above, the reference signal 210 is generated by the digital-to-analog controller 212 that receives the digital sine wave 214 and the reference amplitude voltage 216. The digital-to-analog controller 212 multiplies the digital sine wave 214 by the reference amplitude voltage 216 to generate the reference signal 210. Thus, as the reference amplitude voltage 216 increases, the voltage amplitude of the reference signal 210 also increases. Likewise, as the reference amplitude voltage 216 decreases, the voltage amplitude of the reference signal 210 also decreases.

At block 304, the method 300 involves receiving the voltage feedback signal 206 at the voltage error amplifier 208. The voltage feedback signal 206 is a voltage output of the process 104, and the process 104 is a device that controls provision of power to the load 106. For example, the process 104 may be an inverter, a converter, an output filter, or any other power regulation mechanism or device.

At block 306, the method 300 involves comparing the reference signal 210 to the voltage feedback signal 206 using the voltage error amplifier 208. The comparison of the reference signal 210 to the voltage feedback signal 206 generates a voltage error value. In an example, the voltage error value represents a difference between the voltage output by the process 104 and a target voltage amount (e.g., as represented by the reference signal 210). The voltage error value is fed into the proportional value block 218, the integral value block 220, and the derivative value block 222 to generate the control function Vout(t) used to control the output of the process 104.

At block 308, the method 300 involves controlling a point-of-regulation sine wave output by the process 104 based on the voltage error value output by the voltage error amplifier 208 and the current feedback signal 226. The process 104 may control output voltage based on the control function Vout(t), which is generated based on the voltage error value fed into the proportional value block 218, the integral value block 220, and the derivative value block 222. The current output by the process 104 is controlled based on the current feedback signal 226.

At block 310, the method 300 involves controlling an adjustable-amplitude sine wave (i.e., the reference signal 210) based on an output of the controller 246 of the reference signal control block 215. As discussed above, the amplitude detector 232 detects an amplitude of the point-of-regulation sine wave output by the process 104. The amplitude is represented as the amplitude feedback signal 233 and is provided to the amplitude error amplifier 234. The amplitude error amplifier 234 compares the amplitude feedback signal 233 with the constant DC reference voltage signal 236, and the output of the amplitude error amplifier 234 may be an amplitude error that represents a difference between the amplitude feedback signal 233 and the constant DC reference voltage signal 236. The amplitude error may be fed into the proportional value block 218, the integral value block 220, and the derivative value block 222 to generate the control function Voutref(t).

Using the control function Voutref(t), the controller 246 adjusts the reference amplitude voltage 216 to change the amplitude value of the reference signal 210. This change in the reference signal 210 is used by the voltage error amplifier 208 to compensate for an increase or decrease in the amplitude of the point-of-regulation sine wave output by the process 104 based on changes to the load 106, the addition of the current sensor 228 at the point-of-regulation, or both. Further, because the reference signal control block 215 operates with a slower response time than the PID control block 209 and the current control loop 230, the reference signal control block 215 does not compete with the control provided by the PID control block 209 and the current control loop 230. Thus, the addition of the reference signal control block 215 to the PID controller 102 does not affect the overall stability of the control system 200.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a method, comprising: receiving a reference signal comprising an adjustable-amplitude sine wave; receiving a voltage feedback signal from a voltage control loop comprising a point-of-regulation sine wave, wherein the voltage control loop comprises a first response time; comparing the reference signal to the voltage feedback signal to generate an error value; controlling the point-of-regulation sine wave based on a proportional-integral-derivative input and a current feedback signal, wherein the proportional-integral-derivative input is based on the error value; and adjusting the reference signal based on an output of an amplitude control loop, wherein the amplitude control loop comprises a second response time that is at least one order of magnitude slower than the first response time of the voltage control loop.

Example 2 is the method of example 1, wherein the proportional-integral-derivative input comprises a control function including a proportional component, an integral component, and a derivative component.

Example 3 is the method of examples 1-2, wherein the output of the amplitude control loop comprises a control function comprising a proportional component and an integral component.

Example 4 is the method of examples 1-3, wherein the control function further comprises a derivative component.

Example 5 is the method of examples 1-4, wherein the first response time is less than 10 ms and the second response time is greater than 100 ms.

Example 6 is the method of examples 1-5, wherein the point-of-regulation sine wave is controlled by an inverter, a converter, or an output filter.

Example 7 is the method of examples 1-6, wherein the point-of-regulation sine wave comprises a polyphase power output.

Example 8 is the method of examples 1-7, comprising: comparing an adjusted reference signal to a new voltage feedback signal to generate a new error value; controlling the point-of-regulation sine wave based on a new proportional-integral-derivative input and the current feedback signal, wherein the new proportional-integral-derivative input is based on the new error value; and adjusting the adjusted reference signal based on a new output of the amplitude control loop.

Example 9 is the method of examples 1-8, comprising: receiving the current feedback signal from a current control loop, wherein the current feedback signal indicates an output current at a point-of-regulation, and the current control loop comprises a third response time that is the same order of magnitude as the first response time.

Example 10 is a system, comprising: a proportional-integral-derivative control block, comprising: a first error amplifier configured to receive a reference signal and a voltage feedback signal and to output a first error value; a process configured to control a point-of-regulation sine wave based on a proportional-integral-derivative control function and a current feedback signal, wherein the proportional-integral-derivative control function is based on the first error value; and a voltage control loop configured to provide the point-of-regulation sine wave to the first error amplifier from the process, wherein the proportional-integral-derivative control block comprises a first response time; and a reference signal control block, comprising: a second error amplifier configured to receive an amplitude of the point-of-regulation sine wave and a direct current reference voltage and to output a second error value; a proportional-integral control function generator configured to generate a proportional-integral control function based on the second error value; a reference amplitude controller configured to control the reference signal received at the first error amplifier based on the proportional-integral control function; and an amplitude control loop configured to provide the proportional-integral control function to the reference amplitude controller, wherein the reference signal control block comprises a second response time greater than the first response time.

Example 11 is the system of example 10, further comprising: a complex programmable logic device, a field-programmable gate array, or a microcontroller configured to generate a digital sine wave; and a digital-to-analog controller configured to generate the reference signal based on the digital sine wave and a reference amplitude voltage generated by the reference amplitude controller.

Example 12 is the system of examples 10-11, wherein the reference signal control block further comprises an amplitude detector configured to detect the amplitude of the point-of-regulation sine wave.

Example 13 is the system of examples 10-12, wherein the process comprises an inverter, a converter, or an output filter.

Example 14 is the system of examples 10-13, wherein the first response time is less than 10 ms, and the second response time is greater than 100 ms.

Example 15 is the system of examples 10-14, wherein the point-of-regulation sine wave comprises a polyphase power output.

Example 16 is a method, comprising: receiving a reference signal comprising an adjustable-amplitude sine wave; receiving a voltage feedback signal comprising an output voltage of a process; comparing the reference signal to the voltage feedback signal to generate a first error value; controlling the output voltage of the process based on: a first proportional control signal that is proportional to the first error value; a first integral control signal based on an integral of the first error value over time, wherein the first integral control signal comprises a first integral gain value; a derivative control signal based on a rate of change over time of the first error value; and a current feedback signal; comparing an amplitude of the output voltage of the process to a constant direct current reference voltage to generate a second error value; and controlling the adjustable-amplitude sine wave based on: a second integral control signal based on the integral of the second error value over time, wherein the second integral control signal comprises a second integral gain value that is smaller than the first integral gain value.

Example 17 is the method of example 16, wherein controlling the adjustable-amplitude sine wave is further based on: a second proportional control signal that is proportional to the second error value.

Example 18 is the method of examples 16-17, wherein the first integral gain value controls a first response time of controlling the output voltage, wherein the second integral gain value controls a second response time of controlling the adjustable-amplitude sine wave, and wherein the second response time is at least an order of magnitude slower than the first response time.

Example 19 is the method of examples 16-18, comprising receiving the current feedback signal from a current control loop, wherein the current feedback signal indicates an output current of the process, and the current control loop comprises a third response time that is the same order of magnitude as the first response time.

Example 20 is the method of examples 16-19, wherein the output voltage comprises a polyphase voltage output.

Different arrangements of the components depicted in the drawings or described above, as well as components and steps not shown or described are possible. Similarly, some features and sub-combinations are useful and may be employed without reference to other features and sub-combinations. Embodiments of the present subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A method comprising:
  receiving a reference signal comprising an adjustable-amplitude sine wave;
  receiving a voltage feedback signal from a voltage control loop comprising a point-of- regulation sine wave, wherein the voltage control loop comprises a first response time;
  comparing the reference signal to the voltage feedback signal to generate an error value;
  controlling the point-of-regulation sine wave based on a proportional-integral-derivative input and a current feedback signal, wherein the proportional-integral-derivative input is based on the error value; and
  adjusting the reference signal based on an output of an amplitude control loop, wherein the amplitude control loop comprises a second response time that is at least one order of magnitude slower than the first response time of the voltage control loop.

2. The method of claim 1, wherein the proportional-integral-derivative input comprises a control function including a proportional component, an integral component, and a derivative component.

3. The method of claim 1, wherein the output of the amplitude control loop comprises a control function comprising a proportional component and an integral component.

4. The method of claim 3, wherein the control function further comprises a derivative component.

5. The method of claim 1, wherein the first response time is less than 10 ms and the second response time is greater than 100 ms.

6. The method of claim 1, wherein the point-of-regulation sine wave is controlled by an inverter, a converter, or an output filter.

7. The method of claim 1, wherein the point-of-regulation sine wave comprises a polyphase power output.

8. The method of claim 1, comprising:
  comparing the adjusted reference signal to a new voltage feedback signal to generate a new error value;
  controlling the point-of-regulation sine wave based on a new proportional-integral- derivative input and the current feedback signal, wherein the new proportional-integral- derivative input is based on the new error value; and
  adjusting the adjusted reference signal based on a new output of the amplitude control loop.

9. The method of claim 1, comprising:
  receiving the current feedback signal from a current control loop, wherein the current feedback signal indicates an output current at a point-of-regulation, and the current control loop comprises a third response time that is the same order of magnitude as the first response time.

10. A system comprising:
a proportional-integral-derivative control block, comprising:
  a first error amplifier configured to receive a reference signal and a voltage feedback signal and to output a first error value;
  a process configured to control a point-of-regulation sine wave based on a proportional-integral-derivative control function and a current feedback signal, wherein the proportional-integral-derivative control function is based on the first error value; and
  a voltage control loop configured to provide the point-of-regulation sine wave to the first error amplifier from the process, wherein the proportional-integral-derivative control block comprises a first response time; and
a reference signal control block, comprising:
  a second error amplifier configured to receive an amplitude of the point-of- regulation sine wave and a direct current reference voltage and to output a second error value;
  a proportional-integral control function generator configured to generate a proportional-integral control function based on the second error value;
  a reference amplitude controller configured to control the reference signal received at the first error amplifier based on the proportional-integral control function;
  and
    an amplitude control loop configured to provide the proportional-integral control function to the reference amplitude controller, wherein the reference signal control block comprises a second response time greater than the first response time..

11. The system of claim 10, further comprising:
a complex programmable logic device, a field-programmable gate array, or a microcontroller configured to generate a digital sine wave; and
a digital-to-analog controller configured to generate the reference signal based on the digital sine wave and a reference amplitude voltage generated by the reference amplitude controller.

12. The system of claim 10, wherein the reference signal control block further comprises an amplitude detector configured to detect the amplitude of the point-of-regulation sine wave.

13. The system of claim 10, wherein the process comprises an inverter, a converter, or an output filter.

14. The system of claim 10, wherein the first response time is less than 10 ms, and the second response time is greater than 100 ms.

15. The system of claim 10, wherein the point-of-regulation sine wave comprises a polyphase power output.

16. A method comprising:
receiving a reference signal comprising an adjustable-amplitude sine wave;
receiving a voltage feedback signal comprising an output voltage of a process;
comparing the reference signal to the voltage feedback signal to generate a first error value;
controlling the output voltage of the process based on:
  a first proportional control signal that is proportional to the first error value;
  a first integral control signal based on an integral of the first error value over time, wherein the first integral control signal comprises a first integral gain value;
  a derivative control signal based on a rate of change over time of the first error value; and
  a current feedback signal;
comparing an amplitude of the output voltage of the process to a constant direct current reference voltage to generate a second error value; and
controlling the adjustable-amplitude sine wave based on:
  a second integral control signal based on the integral of the second error value over time, wherein the second integral control signal comprises a second integral gain value that is smaller than the first integral gain value.

17. The method of claim 16, wherein controlling the adjustable-amplitude sine wave is further based on:
a second proportional control signal that is proportional to the second error value.

18. The method of claim 16, wherein the first integral gain value controls a first response time of controlling the output voltage, wherein the second integral gain value controls a second response time of controlling the adjustable-amplitude sine wave, and wherein the second response time is at least an order of magnitude slower than the first response time.

19. The method of claim 18, comprising receiving the current feedback signal from a current control loop, wherein the current feedback signal indicates an output current of the process, and the current control loop comprises a third response time that is the same order of magnitude as the first response time.

20. The method of claim 16, wherein the output voltage comprises a polyphase voltage output.

* * * * *